(12) United States Patent
Sarker et al.

(10) Patent No.: US 12,102,095 B2
(45) Date of Patent: Oct. 1, 2024

(54) COMPOSITION COMPRISING AN ALKALINE BASE AND THIOGLYCOLATE SALT FOR CLEANING AND DECONTAMINATING ANIMAL CARCASSES

(71) Applicant: The United States of America, as represented by the Secretary of Agriculture, Washington, DC (US)

(72) Inventors: Majher I. Sarker, Hatfield, PA (US); Wilbert Long, III, Philadelphia, PA (US); Cheng Kung Liu, Maple Glen, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 18/308,295

(22) Filed: Apr. 27, 2023

(65) Prior Publication Data

US 2023/0329249 A1   Oct. 19, 2023

Related U.S. Application Data

(63) Continuation of application No. 16/580,586, filed on Sep. 24, 2019, now Pat. No. 11,700,860.

(60) Provisional application No. 62/737,215, filed on Sep. 27, 2018.

(51) Int. Cl.
| | |
|---|---|
| *C14C 1/06* | (2006.01) |
| *A01N 43/66* | (2006.01) |
| *A22B 5/00* | (2006.01) |
| *C11D 1/04* | (2006.01) |
| *C11D 3/04* | (2006.01) |
| *C11D 3/32* | (2006.01) |
| *C11D 3/48* | (2006.01) |

(52) U.S. Cl.
CPC ............ *A22B 5/0082* (2013.01); *A01N 43/66* (2013.01); *C11D 1/04* (2013.01); *C11D 3/044* (2013.01); *C11D 3/323* (2013.01); *C11D 3/48* (2013.01); *C11D 2111/10* (2024.01)

(58) Field of Classification Search
CPC .. C14C 9/00; C14C 1/06; C14C 15/00; A22B 5/82; C11D 1/62; C11D 3/044; C11D 3/48; C11D 3/3427; C11D 11/0017
See application file for complete search history.

(56) References Cited

U.S. PATENT DOCUMENTS

| | | | |
|---|---|---|---|
| 4,548,608 A | 10/1985 | Swanson et al. | |
| 4,581,148 A | 4/1986 | Swanson et al. | |
| 5,520,575 A | 5/1996 | Dickson | |
| 5,630,883 A * | 5/1997 | Steer .................. | C11D 3/10 510/195 |
| 5,753,214 A | 5/1998 | Yoshioka et al. | |
| 5,931,172 A * | 8/1999 | Steer .................. | C11D 3/2086 510/195 |
| 6,689,172 B1 | 2/2004 | Feigel et al. | |
| 8,603,550 B1 * | 12/2013 | Fusco ................. | A61K 8/9789 424/725 |
| 2001/0027288 A1 | 10/2001 | Tapper | |
| 2007/0022541 A1 | 2/2007 | Taeger et al. | |
| 2008/0182494 A1 | 7/2008 | Potter et al. | |
| 2008/0213444 A1 | 9/2008 | Mixon et al. | |
| 2014/0113254 A1 | 4/2014 | Dukoff | |
| 2014/0148083 A1 | 5/2014 | Potter et al. | |
| 2015/0342871 A1 * | 12/2015 | Buyuktimkin ....... | A61K 9/0014 514/655 |
| 2017/0304157 A1 | 10/2017 | Dukoff | |
| 2020/0113935 A1 | 4/2020 | Dukoff | |
| 2022/0054378 A1 * | 2/2022 | Pillai .................... | A61Q 19/10 |

FOREIGN PATENT DOCUMENTS

WO   03001931 A1   1/2003

OTHER PUBLICATIONS

ISR/WO (International Search Report/Written Opinion) in International Application No. PCT/US2019/053060 dated Jan. 13, 2020.
Long III, Wilbert, et al., "Evaluation of Novel Pre-Slaughter Cattle Wash Formulations for Meat and Byproduct Safety and Quality", Adv. J. Food Sci. Technol., vol. 14, No. 2, 2018, pp. 33-41.

* cited by examiner

*Primary Examiner* — Charles I Boyer
(74) *Attorney, Agent, or Firm* — John Fado; Matthew Bussan

(57) ABSTRACT

Compositions and methods for cleaning and decontaminating animal carcasses are disclosed. The compositions comprise a mud ball remover having a thioglycolate salt and a base and an antimicrobial agent effective to remove mud balls and reduce microbial contamination of a hide surface at ambient temperatures. The methods comprise cleaning and decontaminating an animal carcass by applying the disclosed compositions onto the surface of the animal carcass to soften and loosen foreign debris attached to the carcass followed by mechanically removing the foreign debris while preserving the integrity and quality of the hide byproduct and resulting leather articles.

15 Claims, 3 Drawing Sheets

COMPOSITION COMPRISING AN ALKALINE BASE AND THIOGLYCOLATE SALT FOR CLEANING AND DECONTAMINATING ANIMAL CARCASSES

CROSS REFERENCE TO RELATED APPLICATION

This application is a continuation of U.S. patent application Ser. No. 16/580,586, filed Sep. 24, 2019, which claims priority to U.S. Provisional Patent Application Ser. No. 62/737,215, filed Sep. 27, 2018, the contents of each of which are incorporated herein by reference in their entirety.

FIELD OF THE INVENTION

The present invention relates generally to novel compositions and methods for cleaning and decontaminating animal carcasses. More specifically, the invention relates to compositions and methods for removing foreign materials and microorganisms including pathogens from the surface of animal carcasses while preserving the integrity and quality of the hides.

BACKGROUND OF THE INVENTION

Animal products such as meats and hides are a universal commodity. In 2017, for example, nearly one billion heads of cattle were reported worldwide, with the United States having one of the most abundant quantities at nearly 94 million heads of cattle (see e.g., USDA, Foreign Agricultural Service, October, 2017; USDA, National Agriculture Statistic Services, January, 2017). In the meat packing and processing industry (e.g., beef and pork), animals undergo a process where the animals are stunned, bled, skinned, eviscerated, and fabricated into meat sections that are packaged for public consumption or restaurant trade with the hides as byproducts. Prior to entering the meat processing facility, animals encounter various foreign materials that adhere and entangle on their hair, including dirt, manure, mud, and plant material as well as microbial contamination. In addition to meat quality and contamination issues related to such foreign materials, mud balls often cause damage such as holes in the hide and destroy this valuable byproduct of the meat packing process. In particular, hardened manure and mud (e.g., adobe-type) attached to animal hair is a major source of meat contamination, hide quality deterioration, and devalued leather products.

The mechanism of adobe-type mud ball formation, for example, is akin to a freeze-thaw process where the manure and/or mud accumulates on the hide hair and hardens as the temperature approaches freezing. As the cycle repeats, it creates hardened mud and/or manure that becomes exceedingly attached and entangled with the hide hair. Adobe-type mud balls often remain attached to the hair when the hides are delivered to tanneries for processing. In a fleshing machine, dull blades scrape the side containing the hair and mud balls while sharper blades flesh the underside. This process causes mechanical damage to the hide by forcefully removing the mud balls from the hair creating holes in the grain. Manure balls can also burst through the hide after they are wedged between the blades and the hide. This results in unusable hides or poor-quality leather products. Washing the hides mitigates some of these problems, but manure balls tend to remain strongly attached to hide hair. Other methods have also been used with limited success such as soaking the hides in solutions of glycerol and sodium carbonate with or without surfactants, enzymatic formulations, and oxidative chemicals such as sodium percarbonate with or without an additional caustic agent (see e.g., Ramos, M. E., et al. (2012) *JALCA*, vol. 107:167-174; Marsico, R. M. & Liu, C. K. (2017) *JALCA*, vol. 112:88-93). Improving the removal of manure and mud balls from the hides will thus alleviate some of the major problems traditionally associated with the cattle industry and meat processing.

Generally, the interior portion of a carcass containing the meat is sterile, but bacterial contamination occurs because of transfer from hides onto the meat during the slaughter and the hide removal processes. The opportunity for microbial contamination of meat and byproducts presents itself upon the cutting open of an animal for disassembly, exposing the interior to microorganisms present in the ambient environment and on the surface of the carcass. The risk of microbial contamination extends throughout the entire process, including final fabrication of the animal into various sections of meat for commercial sale. In many cases, this bacterial contamination contains microorganisms that are pathogenic to humans. Enteric pathogenic bacteria, for example, on cattle surfaces serve as significant hazard and pose a substantial challenge to the meat industry as well as to public health. Such pathogens may arise from environmental exposures including from soil and manure during the lifespan of cattle, which may become firmly lodged onto their hides and hair and thus limits cleaning and decontamination efficacy. Therefore, incomplete decontamination of carcasses prior to hide removal serves as a prime source of pathogen transfer to meat during slaughter house processing that leads to numerous public health risks and substantial economic loss. Previous studies revealed that meat contamination with pathogens is strongly correlated to hide contamination.

Fecal and plant material (sometimes referred to generally as mud balls or manure balls) associated with hide surfaces serves as a prime source of microbial carcass contamination during animal slaughter and meat processing. Washing with water alone, for example, has limited effectiveness to remove foreign materials and decontaminate the surface of the hide because it cannot reach under mud balls which commonly approach and surpass the size of tennis balls. Therefore, it is important to remove mud balls to decrease bacterial contamination on animal carcasses prior to hide removal to reduce the risk of human exposure to these microorganisms. Mechanical removal methods such as shaving are inefficient, cumbersome, and inadequate to fully remove the foreign materials and contamination. Survival of harbored bacteria can also facilitate cross-contamination of the underlying meat and meat processing equipment. Cleaning with water or washing formulations which are currently standard in the industry has shown to have minimal effects on bacterial populations and associated cross-contamination. Research data reveals thoroughly removing external debris from the haired surface of hides significantly reduces bacterial populations including pathogens present in slaughter facilities.

There thus exists an ongoing industrial need to develop improved compositions and methods for efficiently cleaning foreign materials including pathogens from animal carcass surfaces. A particular need exists for the removal of manure balls from animal hides as well as decontamination of animal carcasses to improve meat safety and prevent cross-contamination in meat packing facilities as well as to lower the likelihood of damage of hides delivered to tanners for leather processing.

SUMMARY OF THE INVENTION

The present invention accordingly provides novel compositions and methods for effectively and efficiently removing foreign materials and debris from animal carcasses in a commercially preferred timeframe as well as reducing microbial contamination in meat packing and processing facilities. The disclosed compositions and methods are surprisingly effective in cleaning animal hides to remove externally attached foreign materials on hides as well as decontaminating the hides to prevent transfer of microorganisms to the meat products, byproducts, and equipment.

In an aspect, the invention provides compositions comprising: (i) a mud ball remover comprising a thioglycolate salt and a base and (ii) an antimicrobial agent, wherein the composition is effective to remove mud balls and reduce microbial contamination of a hide surface at ambient temperature. In a further aspect, the invention relates to methods of cleaning and decontaminating a surface of an animal carcass. The methods include applying an aqueous composition of a mud ball remover comprising at least one thioglycolate salt and at least one base combined with at least one antimicrobial agent onto the surface of the animal carcass to create a treated animal carcass; allowing said composition to stay on the treated animal carcass for an effective time to create a prepared animal carcass; and mechanically agitating the prepared animal carcass to remove mud balls and other foreign materials from the surface of the prepared animal carcass to create a cleaned animal carcass.

It is an advantage of the invention to provide novel compositions and methods to clean and decontaminate animal carcasses prior to hide removal to produce safer meat products and maintain the integrity and quality of hide byproducts produced by the meat packing industry.

It is another advantage of the present invention to provide novel compositions and methods to reduce the risk of cross-contamination of bacterial populations including pathogens on equipment used by the meat packing industry.

It is a further advantage of the present invention to provide novel compositions and methods for cleaning animal hides using components that are not harmful to humans.

It is yet another advantage of the present invention to provide improved compositions and methods for cleaning and decontaminating animal carcasses that reduce costs and cross-contamination during meat processing.

An additional advantage of the invention is to provide compositions and methods to clean and decontaminate animal carcasses within a commercially desirable timeframe while also preventing cross-contamination in meat processing facilities.

Yet another advantage of the invention is to provide compositions and methods for cleaning and decontaminating animal carcasses while preventing damage to hides to result in higher quality finished leather products.

A further advantage of the present invention is to provide low odor or odorless compositions for cleaning and decontaminating animal carcasses.

This summary is provided to introduce a selection of concepts in a simplified form that are further described below in the detailed description. This summary is not intended to identify all key or essential features of the claimed subject matter, nor is it intended to limit the scope of the claimed subject matter.

DETAILED DESCRIPTION OF THE INVENTION

Figure 1:
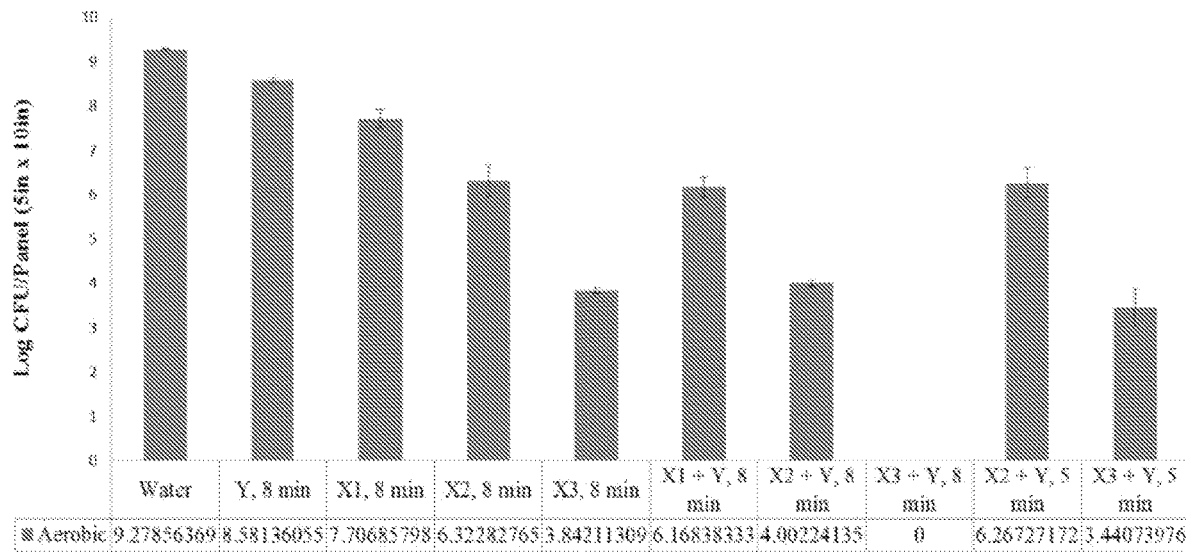
FIG. 1 graphically illustrates the number of colony forming units of aerobic bacteria present on animal hide surfaces that were treated using the compositions and methods of the invention.

Unless herein defined otherwise, all technical and scientific terms used herein generally have the same meaning as commonly understood by one of ordinary skill in the art to which this invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products.

As used in the description of the invention and the appended claims, the singular forms "a," "an," and "the" are intended to include the plural forms as well, unless the context clearly indicates otherwise.

The term "animal" refers to any member of the kingdom Animalia which is raised commercially and consumed as food by humans or animals, including for example, bovine, ovine, and porcine.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments.

The term "effective amount" or "effective time" refers to such amount or time as is capable of performing the function (s) of the compositions or methods for which an effective amount or time is expressed. As is pointed out herein, the exact amount or time required may vary from process to process, depending on recognized variables such as the compounds employed and various internal and external conditions observed as would be interpreted by one of ordinary skill in the art. Thus, it is not possible to specify an exact "effective amount" or "effective time" for every scenario though preferred ranges have been provided herein. An appropriate effective amount or time may be determined, however, by one of ordinary skill in the art using only routine experimentation.

The term "hide" refers to the integument of an animal and also includes the hair layer thereon. The primary function of the integumentary layer while the animal is alive is to form a protective barrier to actively prevent the penetration of foreign material to the interior of the animal. Microorganisms are usually present in the hair and on the surface of the integumentary layer as well as within mud balls. However, microorganisms are generally unable to penetrate into and through an undamaged intact living animal integumentary layer but can begin to enter shortly upon the death of the animal.

The term "mud ball" or "manure ball" refers to foreign materials that are of variable consistency (e.g., soft, crumbly, pliable, sticky, pasty, adobe-type, etc.) including any one or more of mud, manure, plant material, etc. that is stuck or imbedded in the hair/feet of an animal and remains on the carcass after the animal is stunned in preparation for a slaughtering process.

The term "optional" or "optionally" means that the subsequently described event or circumstance may or may not occur, and that the description includes instances and embodiments in which said event or circumstance occurs and instances and embodiments where it does not. For example, the phrase "optionally rinsing the treated animal carcass" means that the treated animal carcass may or may not be rinsed and that this description includes methods that contain and do not contain a rinsing step.

The term "pathogen" refers to the microorganisms (e.g., bacteria, viruses, protozoa, etc.) that are of concern when present on animal carcasses or surfaces thereof and which may be harmful to the products or byproducts derived from such animal carcasses and responsible for microbial food contamination posing a potential public safety threat as well as possible harm to consumers of the products or byproducts.

The term "reduce microbial contamination" refers to reducing the number of microorganisms and/or pathogens present on a surface of an animal carcass to an acceptable level (in some cases eliminating) that prevents contamination of the underlying meat and/or consumer of such underlying meat.

The term "solution" refers to a composition in which all of the indicated ingredients are dissolved in the aqueous phase and excludes dispersions, for example, in which an indicated ingredient is present in a greater than saturation concentration whereby at least some of this ingredient is present as a dispersed solid. However, this term may not exclude non-dissolved non-indicated components such as when a solution is recovered and reused/recycled in a process.

The term "surface" or "hide surface" refers to the outer portion of the hide (i.e., outer layer, section, or portion) of an animal carcass that would come into contact with the ambient environment or with a treatment applied to the animal carcass.

The present invention provides a cost and labor efficient way of cleaning and processing animal carcasses as well as reducing risks associated with microbial contamination. The compositions of the invented formulations are capable of efficiently removing foreign materials from animal carcasses and simultaneously providing decontamination of the outer surface of the carcass prior to meat processing for meat safety while simultaneously protecting the integrity of the animal hide and resulting finished leather goods as valuable byproducts of the meat industry. Foreign materials such as mud/manure balls firmly attached to the hair of animal skin harboring microbial pathogens (e.g., *Salmonella, Escherichia coli*, other *Enterobacteria*, and related gram-negative bacilli, etc.) are removed with surprising effectiveness using the novel compositions and methods of this invention to achieve a "deep clean" of the animal carcass surface. The invention provides novel compositions and methods to preserve the integrity and quality of meat processing industry products and byproducts by efficiently and effectively treating the animal carcasses before disassembly during the slaughtering process. The compositions efficiently remove foreign debris and materials from animal carcasses within a commercially desired timeframe and also reduce microbial contamination and cross-contamination of such products and equipment used to process the products. Upon application onto animal carcasses, the inventive compositions and methods act to loosen foreign materials and debris associated with the hide of the animal, including dirt, mud, manure, and microorganisms within such debris and on the hair or hide. The invention additionally provides methods for using the compositions to minimize costs and environmental impact.

The compositions of the invention include an aqueous solution of (i) a mud ball removal component comprising at least one thioglycolate salt and at least one base and (ii) at least one antibacterial agent. The composition may optionally have one or more additional wetting agents to aid in dispersing the formulation and more effective cleaning. Each component is present in an effective amount to enable the composition to clean and decontaminate animal hides at ambient temperature within a commercially desirable timeframe. The thioglycolate salt component is present in an effective amount to aid in removing mud balls or other solid, semi-solid, firm, gelled, etc. foreign materials at ambient temperature in combination with an effective amount of the base when subsequent mechanical removal methods are used as further described herein. The antimicrobial component is present in an amount effective to reduce microbial contamination on the target animal hide and prevent cross contamination of pathogens and other microorganisms from the haired surface to the underlying meat within a processing facility.

The concentration of ingredients in the inventive compositions for use in the methods of the invention are set forth in Table 1 (ranges to be interpreted as having "about" preceding the numbers and given in terms of wt %) to encompass various embodiments as described herein. The ratio of thioglycolate salt to base is preferably in the range of about 5:1 to about 1:5, or from about 3:1 to about 1:3, or from about 2:1 to about 1:2, or about 1:1.

TABLE 1

| Ingredient | Broadest | Broad | Intermediate | Narrow |
| --- | --- | --- | --- | --- |
| Thioglycolate Salt | 2% to 10% | 4% to 10% | 6% to 10% | 7.5% to 10% |
| Base | 2% to 10% | 4% to 10% | 6% to 10% | 7.5% to 10% |
| Anti-Microbial | 0.2% to 2% | 0.4% to 2% | 0.6% to 2% | 0.75% to 1% |

The thioglycolate salt and base components function in combination as a mud ball remover to dissolve, disintegrate, remove, etc. cellulosic and other foreign materials from the surface of the animal carcass. These components in the inventive composition cause the mud balls to soften surprisingly quickly for removal with minimal mechanical agitation.

Preferably, a salt of thioglycolic acid (e.g., potassium, sodium, calcium, or ammonium thioglycolate as well as combinations and other thioglycolate salts) is used in the inventive composition. Not intending to be theory bound, thioglycolate dissolves the disulphide bonds in the keratin of the hair to release the mud balls or other foreign materials firmly attached to the haired hide surface of the animal carcass while the combination with a base increases the pH which helps in delivering thioglycolate to the hair to effectuate the release. In embodiments, preferred thioglycolate salts are potassium, sodium, calcium, ammonium thioglycolate salts, other salts thereof, and combinations thereof. Any water-soluble salt of thioglycolic acid may be used.

The base component is added because it was discovered thioglycolate salts in a high pH solution penetrate and soften the mud balls as well as dissolve the keratin of the hair by which the foreign materials are firmly attached on the surface of animal carcasses. This efficient softening action helps for quick loosening and removal of debris from the haired surface of the animal carcass. In embodiments, bases such as NaOH, KOH, $Ca(OH)_2$, $NH_4OH$, the like, or combinations thereof may be used. Stronger bases such as NaOH and KOH are generally preferred.

The foreign materials including mud/manure balls present on animal carcasses harbor microbial contaminants that if allowed to remain on the carcass cause unsafe and unsanitary conditions especially when the hide is removed, and the meat is processed at a later stage. To combat this contamination scenario, the inventive composition also includes a water-soluble antimicrobial or antibacterial component. A preferred antimicrobial agent used in the formulation is a water-soluble N-halamine (R1,R2—N—X), where R1 and R2 independently are selected from, for example, H, Cl, Br, inorganic group (e.g., phosphate, sulphate, etc.), or organic group (e.g., alkyl, aryl, carbonyl, etc.) and X is selected from, for example, Cl, Br, or I. N-halamines are a group of cyclic or acyclic compounds containing one or more nitrogen-halogen covalent bonds normally formed by the halogenation of imide, amide, or amine groups, and typically exert biocidal activity because of the oxidation state of halide atoms (e.g., +1) in the molecule. Water-soluble N-halamines are in a salt form; however, not all salt forms are water-soluble and such forms would not be used in the inventive compositions. N-halamine also exhibits long-term stability in aqueous solutions and is effective against a broad spectrum of microorganisms. In addition, N-halamine compounds are less corrosive than inorganic chlorine-containing formulations such as bleach, have acceptable levels of toxicity, economically viable, considered safe for humans, and environmentally friendly (see e.g., *Int. J Hyg. Environ.-Health*, 2006, 209, 173-181; *Biomacromolecules*, 2013, 14, 548-601; *Journal of Food Protoection*, 2003, 66(9), 1697-1700. *Food Control*, 2018, 84 255-262; *Critical Reviews in Environ. Sci. and Techol.*, 1988, 18(2), 133-175). For the present invention, sodium dichloroisocyanurate dihydrate is an example of a preferred N-halamine compound that is highly water-soluble. Preferred antimicrobial agents also include water-soluble antimicrobials such as alkyltrimethylammonium bromide (ATMB), chlorhexidine digluconate (CDG), benzalkonium chloride (BAC), N-halamines, and combinations thereof. Incorporating one or more of these antimicrobial components significantly reduces the microbial contamination from the haired surface of hides especially when used in aqueous-based washing solution at low concentrations to avoid cross-contamination of microorganism from the haired surface of the carcass to underlying meat and/or equipment in the facility. In a preferred embodiment, a unique composition of potassium thioglycolate plus sodium hydroxide plus a specific water-soluble halamine is used to develop the final formulation.

To clean animal carcasses for meat safety and byproduct quality, an aqueous-based formulation of the inventive composition herein disclosed is used. Aqueous-based formulations generally are relatively cheaper in comparison to organic formulations and also more environmentally friendly. To develop the aqueous-based formulation of the invention it is necessary for all the components to be soluble in water individually or in combined composition, otherwise additional components such surfactants or emulsifying agents would need to be incorporated to solubilize the inventive components. Combined compositions such as potassium thioglycolate, sodium hydroxide, and water-soluble halamine (e.g., sodium dichloroisocyanurate dehydrate) gives the inventive formulation a unique aqueous solubility characteristic. This novel formulation is found to be effective in a dual action capacity, loosening and removing mud/manure balls or foreign materials from the carcass surface and also simultaneously decontaminating it in a commercially preferred time frame. Another surprising and unexpected advantage of this inventive composition is individually potassium thioglycolate and sodium dichloroisocyanurate dehydrate have a pungent odor but when they are combined the formulation become essentially odorless (e.g., low odor, very low odor, very mild odor, or odorless).

In embodiments, a concentrated form or solid/powder form containing all of the ingredients of the inventive composition for use in a meat packing facility could be made in the same relative proportions and be made up in bulk, packaged in suitable containers, stored, shipped, and then diluted and/or dissolved with a suitable amount of water (e.g., the concentrate may also be packaged with dilution or dissolution instructions) before use. Any source of water approved for use at a specific facility may be utilized that is available at the point of use, including raw, tap, filtered, recycled, the like, and combinations thereof. Furthermore, the invention also provides kits which are useful for carrying out methods of the present invention. The kit includes a container comprising compositions of the present invention and instructions for using the compositions for the purposes herein disclosed. The kits may comprise a first container means containing the compositions described herein. The kit can also comprise other container means having one or more solutions, diluents, or applicators necessary or convenient for carrying out the invention. The container means can be made of glass, plastic, foil, the like, and combinations thereof and can be any suitable vial, bottle, pouch, tube, bag, box, sachet, etc. The kit can also contain written information, such as procedures for carrying out the present invention or analytical information, such as the amount of reagent contained in the first container means. The container means can be in another container means (e.g., a box, bag, etc.) along with the written information. The inventive composition would be provided in a container that would preserve its integrity until use. The container could be opened and poured into the correct pre-measured amount of an aqueous diluent. Alternatively, the container type is selected from a variety of materials, such as biodegradable or bio-based plastic. In another example, the container is water-soluble and could dropped into a pre-measured amount of water to achieve an aqueous composition having the desired concentration.

Though any application technique could be used to apply the disclosed composition to an animal carcass, it is preferred that the inventive composition is sprayed onto surfaces of animal carcasses prior to evisceration and allowed to react with foreign materials such as mud balls for an effective time period for the mud balls to loosen and soften for ease of removal. In alternative embodiments, any suitable application technique can be used for applying the inventive composition including spraying (e.g., direct spraying, misting, immersion, fogging, etc.), curtain coating, wetting, soaking, and the like. The amount of the composition applied to the hide surface is typically from about 10 mL to about 100 mL, or from about 20 mL to about 75 mL, or from about 25 mL to about 50 mL per square foot of hide surface and is adjusted by a skilled artisan depending on the amount of debris and severity of mud/manure balls present on the hide surface.

The composition preferably remains on the surface of the carcass for an effective time to penetrate mud balls and inactive microorganisms to reduce microbial contamination. Regardless of the particular application technique used, the contact time during which the composition of the invention remains in contact with the carcass being treated is typically for about 1 to about 20 minutes, or from 1 to about 15 minutes, or from 2 to about 15 minutes, or from about 2 to about 10 minutes, or from about 3 to about 10 minutes, or form about 4 to about 10 minutes, or from about 5 to about 8 minutes and is adjusted by a skilled artisan depending on the amount of debris and severity of mud/manure balls present on the hide surface. In embodiments, the exposure time period can be adjusted by changing the concentration of the formulation and a determination of concentration and reaction time is slaughter house dependent. These parameters may be adjusted and optimized by a skilled artisan.

After sufficient exposure to the inventive composition, foreign materials including mud/manure balls can be removed from the animal carcass with mechanical agitation (e.g., soft brushing, wiping, scraping, pressure washing, etc.) and the carcass can be rinsed with water or other washing agent to remove any residual chemicals before removing the hide for further meat processing. The developed composition of the invention allows mud balls to be wiped off of a hide surface with minimal mechanical agitation after a surprisingly short amount of exposure to the composition at ambient temperature (e.g., any temperature encountered at a meat processing facility year-round). It should be appreciated that the composition may also be heated prior to application but is desired to be applied at ambient temperature to conserve energy.

In embodiments, mechanical agitation includes any means in the art such as brushing (e.g., soft, medium, or hard bristle), scraping, wiping, shaving, pressure washing, etc. A preferred mechanical agitation method is using a soft brush to preserve the quality of the hide and make the mechanical agitation process less labor-intensive. After dispensing the inventive formulation and allowing it on the hide surface for a certain period, the foreign materials and mud/manure balls are wiped off from the haired surface of hide with brushing or by any other mechanical means such as controlled pressure washing which is suitable for cleaning but not piercing or damaging the hide.

In embodiments, the methods include applying the disclosed inventive composition to the animal carcass and leaving said composition on the carcass for an effective time. Mechanical agitation as herein described is then applied to remove softened and loosened foreign debris including mud/manure balls from the hide surface. The treated carcass is optionally rinsed (e.g., with potable water or other washing agent) if desired to remove any residual composition. It is generally desirable to rinse the treated hide with water at the post-treatment stage to remove residual water-soluble chemicals in the inventive formulation and the remaining foreign materials from the carcass surface prior to removal of hide from the animal carcass and subsequent meat processing.

In embodiments, the methods of the invention also include recycling/reusing of the formulation as it runs off of the animal carcass after application. The recycling process includes the collection of excess formulation at the treatment stage and run off rinsing water at the post-treatment stage. The collected used formulation is then sent through any suitable filtration process. The two collections (i.e., applied formulation and rinse water) can be treated separately or combined for their adjustment of the active ingredients of the inventive composition based on the feasibility level of the particular location as determined by a skilled artisan. The adjustment process of the recycling solutions to be reused can be determined upon experimental data derived from samples taken at the time of recycling and individual operation parameters for a specific facility.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

Example 1

Aqueous formulations tested are shown in Table 2 in terms of wt % for each component.

TABLE 2

| Formulation | Composition |
| --- | --- |
| X1: Low concentration removal solution | 2.5% NaOH + 2.5% K-thioglycolate |
| X2: Medium concentration removal solution | 5% NaOH + 5% K-thioglycolate |
| X3: High concentration removal solution | 7.5% NaOH + 7.5% K-thioglycolate |
| Y: Anti-Microbial solution | 0.75% sodium dichloroisocyanurate dihydrate |

Formulations from Table 2 were sprayed on bovine hide samples with mud balls naturally attached. After 5 or 8 minutes hide samples were brushed to wipe off the external debris from the hide surface using a soft brush. The tested formulations were effective to quickly convert the mud balls to a state to enable removal by using only a soft bristle brush.

The individual chemicals (K-thioglycolate, sodium dichloroisocyanurate dihydrate) used for this inventive formulation of the example have pungent odors. These odors generally present limitations for using them individually in different steps of the operation in meat processing facilities. However, the combined formulation is surprisingly and unexpectedly essentially odorless which makes it suitable for use in such facilities as a cleaning and decontamination agent on animal carcasses to remove/reduce foreign materials as well as microorganisms from the hide surface prior to slaughter.

Figure 2:
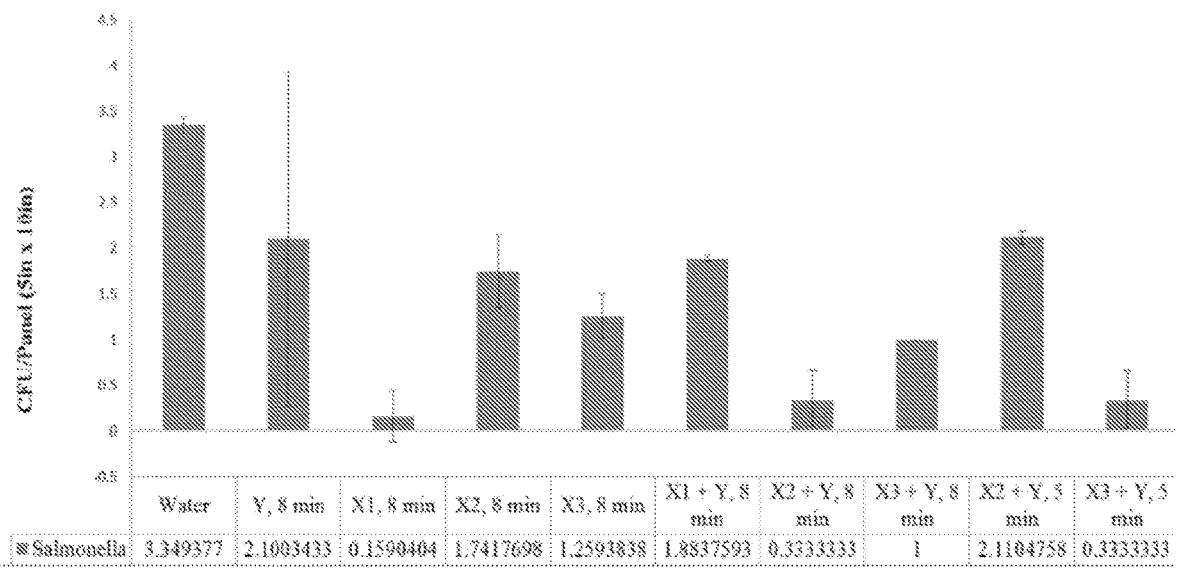
FIG. 2 graphically illustrates the number of colony forming units of *Salmonella* bacteria present on animal hide surfaces that were treated using the compositions and methods of the invention.
Figure 3:
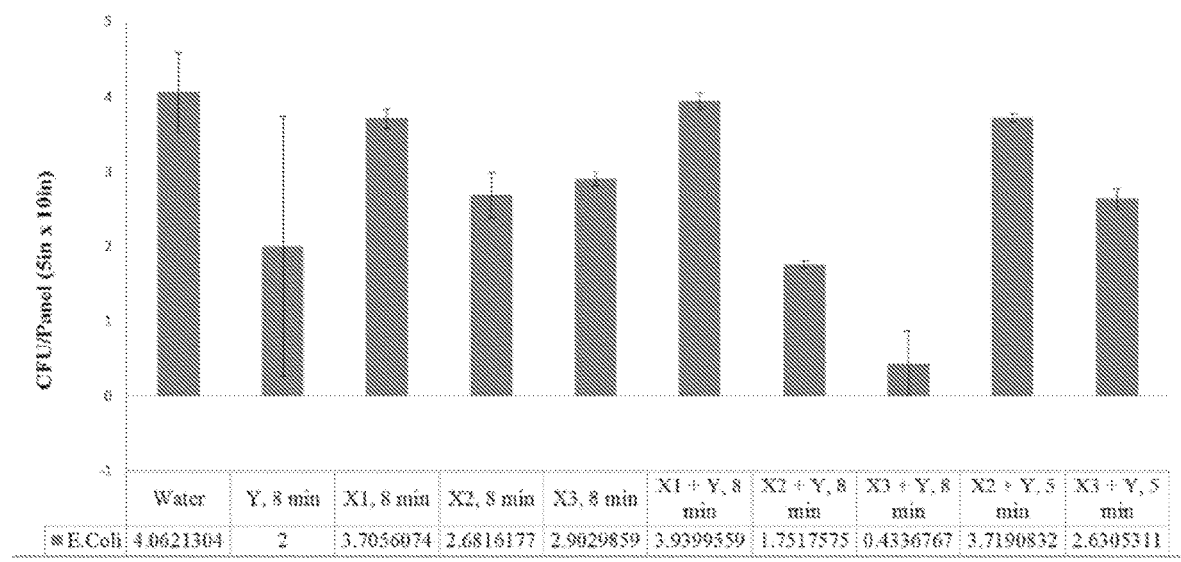
FIG. 3 graphically illustrates the number of colony forming units of *E. coli* bacteria present on animal hide surfaces that were treated using the compositions and methods of the invention.

Analysis for Microbial Recovery. After brushing the treated sample panels to get rid of the foreign debris and mud balls, a 10 in×5 in surface area was independently swabbed with a sterile sponge and placed into a corresponding sampling bag with 25 ml of buffered peptone water for analysis (Nasco Meat and Turkey Carcass Sampling Kit, Salida, CA). The sample bags were then hand massaged for about 2 min. Samples were serially diluted and spread-plated on Tryptic Soy Agar (TSA), Xylose-Lysine-Tergitol 4 (XLT-4) Agar, Sorbitol MacConkey Agar, with Cefixime and Tellurite (CT-SMAC) for aerobic bacteria, *Salmonella* and *E. coli* counts, respectively (all agar was obtained from Fisher Scientific, Pittsburg, PA). After spread plating, samples were incubated for 24 hours at 37° C. and bacterial colonies were enumerated for bacterial recovery with the lowest detection level at 1 CFU per 10 in×5in area. Results are shown graphically in FIG. 1 for aerobic bacteria, FIG. 2 for *Salmonella*, and FIG. 3 for *E. coli* counts.

These results indicate that with a treatment which exposes a hide heavily covered in mud balls to a composition of the present invention for 8 minutes, aerobic bacteria were eliminated. Exposures of 5 minutes result in an approximately 5.87 log CFU reduction of aerobic bacteria as compared to a water wash only. For *Salmonella*, an approximately 3 log CFU reduction is attained at both at 5 and 8 minutes. Similarly for *E. coli*, 1.4 and 3.6 log CFU reductions are observed at 5 and 8 minutes respectively. These results are quite surprising and unexpected under such low exposure times at room temperature (e.g., 22° C. to 25° C.).

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety, including any materials cited within such referenced materials. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

The claimed invention is:

1. A mud ball removing composition comprising:
   (i) at least one thioglycolate salt;
   (ii) at least one alkaline base; and
   (iii) at least one antimicrobial agent, wherein the at least one antimicrobial agent is water soluble and selected from the group consisting of: alkyltrimethylammonium bromide, chlorhexidine digluconate, N-halamines, and combinations thereof, wherein the at least one antimicrobial agent is present in an amount ranging from about 0.2 to about 2 in terms of wt %, and wherein the composition is effective to remove mud balls and reduce contamination of a hide surface at ambient temperature.

2. The composition of claim 1, wherein the at least one thioglycolate salt component of the mud ball remover is selected from the group consisting of: potassium thioglycolate, sodium thioglycolate, calcium thioglycolate, ammonium thioglycolate, and combinations thereof.

3. The composition of claim 1, wherein the at least one thioglycolate salt is present in an amount ranging from about 2 to about 10 in terms of wt %.

4. The composition of claim 1, wherein the at least one alkaline base of the mud ball remover is selected from the group consisting of: NaOH, KOH, Ca(OH)$_2$, NH$_4$OH, and combinations thereof.

5. A mud ball removing composition comprising:
   (i) at least one thioglycolate salt;
   (ii) at least one alkaline base, wherein the at least alkaline base is present in an amount ranging from about 2 to about 10 in terms of wt; and
   at least one antimicrobial agent, wherein the at least one antimicrobial agent is water soluble and selected from the group consisting of: alkyltrimethylammonium bromide, chlorhexidine digluconate, N-halamines, and combinations thereof, wherein the at least one antimicrobial agent is present in an amount of at least about 0.2 wt %, and wherein the composition is effective to remove mud balls and reduce contamination of a hide surface at ambient temperature.

6. The composition of claim 1, wherein a ratio of the at least one thioglycolate salt to the at least one alkaline base is from about 5:1 to about 1:5.

7. The composition of claim 1, wherein a ratio of the at least one thioglycolate salt to the at least one alkaline base is about 1:1, and wherein the composition is essentially odorless.

8. A mud ball removing composition comprising:
   (i) at least one thioglycolate salt;
   (ii) at least one alkaline base, wherein the at least one alkaline base of the mud ball remover is selected from the group consisting of: NaOH, KOH, Ca(OH)2, NH4OH, and combinations thereof; and (iii) at least one antimicrobial agent, wherein the at least one antimicrobial agent is water soluble and includes at least one N-halamine, and wherein the composition is effective to remove mud balls and reduce contamination of a hide surface at ambient temperature.

9. The composition of claim 8, wherein the at least one antimicrobial agent includes sodium dichloroisocyanurate dihydrate.

10. The composition of claim 8, wherein the at least one thioglycolate salt component of the mud ball remover is selected from the group consisting of: potassium thioglycolate, sodium thioglycolate, calcium thioglycolate, ammonium thioglycolate, and combinations thereof.

11. The composition of claim 8, wherein the at least one thioglycolate salt component of the mud ball remover includes potassium thioglycolate, and wherein the at least one antimicrobial agent includes sodium dichloroisocyanurate dihydrate.

12. The composition of claim 8, wherein the at least one thioglycolate salt component of the mud ball remover includes potassium thioglycolate, wherein the at least one alkaline base of the mud ball remover is selected from the group consisting of: NaOH, KOH, and combinations thereof, and wherein the at least one antimicrobial agent includes sodium dichloroisocyanurate dihydrate.

13. The composition of claim 8 wherein a ratio of the at least one thioglycolate salt to the at least one alkaline base is about 1:1, and wherein the composition is essentially odorless.

14. A method of cleaning and decontaminating a surface of an animal carcass, the method comprising: applying the composition of claim 8 onto the surface of the animal carcass to create a treated animal carcass; allowing said composition to stay on the treated animal carcass for an effective time to create a prepared animal carcass; and mechanically agitating the prepared animal carcass to remove mud balls and other foreign materials from the surface of the prepared animal carcass to create a cleaned and decontaminated animal carcass.

15. A kit for carrying out the method of claim 14, the kit comprising a first container means containing the composition; optionally other container means comprising a solution, diluent, or applicator for the compound; and written information including procedures for applying the composition.

* * * * *